United States Patent
Konrad et al.

(10) Patent No.: US 11,951,936 B2
(45) Date of Patent: Apr. 9, 2024

(54) DOOR HANDLE FOR A VEHICLE DOOR

(71) Applicant: MERCEDES-BENZ GROUP AG, Stuttgart (DE)

(72) Inventors: Tobias Konrad, Böblingen (DE); Martin Lindmayer, Sulz (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 311 days.

(21) Appl. No.: 17/636,412

(22) PCT Filed: Jul. 29, 2020

(86) PCT No.: PCT/EP2020/071437
§ 371 (c)(1),
(2) Date: Feb. 18, 2022

(87) PCT Pub. No.: WO2021/032431
PCT Pub. Date: Feb. 25, 2021

(65) Prior Publication Data
US 2022/0281410 A1    Sep. 8, 2022

(30) Foreign Application Priority Data
Aug. 21, 2019  (DE) .................... 10 2019 005 902.6

(51) Int. Cl.
*B60Q 1/26* (2006.01)
*B60R 25/01* (2013.01)
(Continued)

(52) U.S. Cl.
CPC ............ *B60R 25/01* (2013.01); *B60Q 1/2669* (2013.01); *B60R 25/24* (2013.01); *E05B 81/56* (2013.01); *E05B 85/107* (2013.01)

(58) Field of Classification Search
CPC ........................ E05B 85/107; B60Q 1/2669
(Continued)

(56) References Cited

U.S. PATENT DOCUMENTS 10,926,692 B2    2/2021   Rhein et al.
11,813,976 B2 *  11/2023  Konrad ................ B60Q 1/323
(Continued)

FOREIGN PATENT DOCUMENTS

CN    105247152 A    1/2016
CN    107923200 A    4/2018
(Continued)

OTHER PUBLICATIONS

Office Action dated Jul. 29, 2022 in related/corresponding CN Application No. 202080060815.2.
(Continued)

*Primary Examiner* — Christopher M Raabe
(74) *Attorney, Agent, or Firm* — PATENT PORTFOLIO BUILDERS PLLC

(57) ABSTRACT

A door handle for a vehicle door of a motor vehicle includes a carrier plate, a handle cavity, and an extendable handle part. At least one lighting device arranged in/on the carrier plate or on the handle part is provided with at least one lighting element and/or a light guide element. The handle part is adjustable between a retracted non-use position, a partially extended intermediate position, and an extended use position. The at least one lighting element and/or the at least one light guide element, when the handle part is in its partially extended intermediate position, at least partially illuminates a gap present between the handle part and the handle cavity. When the handle part is extended, at least one lighting element and/or the at least one light guide element illuminates at least parts of the handle part, of the handle cavity, and/or of an area surrounding the handle part.

10 Claims, 2 Drawing Sheets

Figure 1:
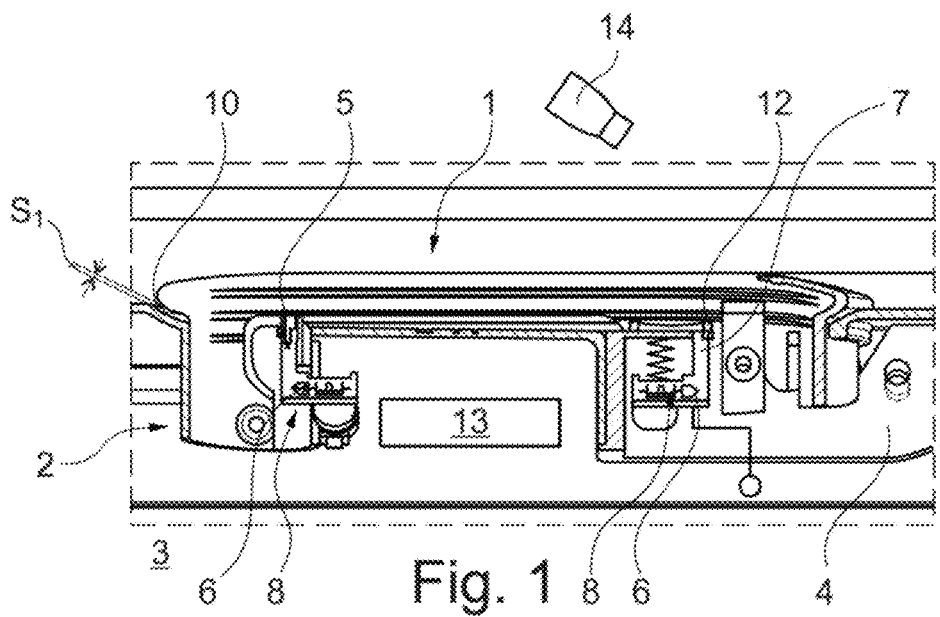

(51) Int. Cl.
*B60R 25/24* (2013.01)
*E05B 81/56* (2014.01)
*E05B 85/10* (2014.01)

(58) Field of Classification Search
USPC ........................................................ 362/501
See application file for complete search history.

(56) References Cited

U.S. PATENT DOCUMENTS

| | | | |
|---|---|---|---|
| 2003/0031025 A1 | 2/2003 | Huizenga | |
| 2011/0148575 A1 | 6/2011 | Sobecki et al. | |
| 2017/0292297 A1* | 10/2017 | Bartels | E05B 85/107 |
| 2023/0203857 A1* | 6/2023 | Kim | E05B 17/10 |
| | | | 70/208 |

FOREIGN PATENT DOCUMENTS

| | | |
|---|---|---|
| CN | 109642441 A | 4/2019 |
| DE | 102004033896 A1 | 2/2006 |
| DE | 102006019284 A1 | 10/2007 |
| DE | 102015010923 A1 | 3/2016 |
| DE | 102016216384 B3 | 7/2017 |
| DE | 102016119447 A1 | 4/2018 |
| DE | 102018005590 A1 | 2/2019 |
| EP | 1975348 A1 | 10/2008 |
| EP | 3032013 A1 | 6/2016 |
| JP | 2007239183 A | 9/2007 |
| WO | 2019011528 A1 | 1/2019 |

OTHER PUBLICATIONS

International Search Report dated Nov. 10, 2020 in related/corresponding International Application No. PCT/EP2020/071437.
Office Action created Jan. 17, 2020 in related/corresponding DE Application No. 10 2019 005 902.6.
Written Opinion mailed Nov. 10, 2020 in related/corresponding International Application No. PCT/EP2020/071437.

* cited by examiner

DOOR HANDLE FOR A VEHICLE DOOR

BACKGROUND AND SUMMARY OF THE INVENTION

Exemplary embodiments of the present invention relate to a door handle for a vehicle door, a motor vehicle having a vehicle door, a door lock and such a door handle, and a method for operating a door handle on a motor vehicle.

DE 10 2004 033 896 A1 describes a generic door handle for a vehicle door with a lighting device that is arranged in the region of the door handle and can be activated with the aid of a remote control device. The remote control device is an electronic key which is connected to the lighting device for communication therewith, in such a way that the lighting device is activated in dimmed form with the aid of the electronic key when the ignition is switched off, provided that a driver approaches the vehicle, wherein the door handle lighting can additionally be used as marking lighting when not in use. This is intended to allow the lighting device to take on several functions.

DE 10 2006 019 284 A1 discloses a vehicle having a vehicle door and with an unlocking mechanism by which the vehicle door can be unlocked. Also provided is a front-area lighting system or a door handle lighting system for front-area light for illuminating the surroundings of the vehicle door or for generating door handle light for illuminating the door handle. Furthermore, a sensor device is provided for generating and outputting a sensor signal in response to front-area light or door handle light reflected by an object, as well as a control device which automatically activates the unlocking mechanism as a function of the sensor signal.

The lighting of door handles on vehicles, in particular motor vehicles, especially direct or indirect lighting, is already known in many ways to increase comfort when entering the vehicle.

However, the disadvantage of illuminated door handles on vehicles known from the prior art is often that they allow only diffuse illumination of the door handle, for example by means of a light-emitting lighting element and/or a light-emitting light guide element, which neither allows the door handle to be found easily and intuitively, nor is able to meet higher design requirements.

Exemplary embodiments of the present invention are therefore directed to providing an improvement or at least an alternative embodiment for a door handle of the generic type, which in particular overcomes the disadvantages known from the prior art.

The present invention is based on the general concept of providing, in a door handle on a vehicle door of a motor vehicle, an extendable handle part, as well as a lighting device arranged thereon or on a carrier plate, and of dividing at least one extension movement of the extendable handle part into different positions when the motor vehicle is opened, wherein an intermediate position is provided between a retracted non-use position and an extended use position, in which intermediate position the handle part is only slightly extended, but the lighting device is already activated and allows, from a design perspective, a highly attractive and intuitive visual marking of the door handle or of the handle part, so that the handle part can be found relatively easily. The door handle according to the invention has a carrier plate, a handle cavity and a handle part that can be moved, in particular extended, relative to the carrier plate. The handle cavity can of course also be part of the carrier plate or of a vehicle door. Also provided is at least one lighting device arranged in/on the carrier plate or on the handle part with at least one lighting element and/or a light guide element. In accordance with the invention, the handle part is now adjustable between a retracted non-use position, a partially extended intermediate position, and an extended use position, wherein the lighting device is deactivated in the retracted non-use position. However, when the handle part is in its partially extended intermediate position, a gap, in particular of a few millimeters, is created between the handle part and the handle cavity and is then at least partially illuminated by the at least one lighting element and/or the at least one light guide element. This annular gap illumination can make it much easier to visually locate the door handle even from a greater distance, wherein the annular gap between the door handle and the handle cavity additionally creates a precisely contoured illumination line, which makes for an extremely attractive design compared to the previous diffuse illumination from the prior art. In the extended use position, the at least one lighting element and/or the at least one light guide element illuminates at least parts of the handle part, of the handle cavity and/or of an area surrounding the handle and thereby likewise makes it easier to visually locate the handle part.

With the door handle according to the invention, it is thus possible to allow a partial extension of the handle part into its intermediate position already when an authorized user approaches the door handle, in which intermediate position the gap, in particular an annular gap, created between the partially extended handle part and the handle cavity or the vehicle door is then illuminated, similar to a target circle. This sharply contoured illumination can provide the approaching user with an excellent visual guidance system by means of which the user can intuitively locate the door handle and thus also the handle part. The door handle can be extended, for example, either by means of what is known as "polling", i.e., remote interrogation, or by active operation by means of an electronic key, for example a remote control. Subsequently, if the authorized person continues to approach, the door handle can be extended into its use position, which can of course be done automatically, for example after a certain time, or by actuating a remote control again. If the vehicle is locked, this can also be done, for example, by means of a corresponding keyless go system or a remote control, in which case the door handle moves into its retracted non-use position and the lighting device is deactivated. By means of the door handle according to the invention and the handle part that can be moved into an intermediate position, it is thus possible to facilitate the locating process as well as to provide a significantly improved design.

In an advantageous refinement of the door handle according to the invention, the gap has a gap width $S_2$ between 1 mm and 5 mm, preferably between 3 mm and 5 mm, when the handle part is in its partially extended intermediate position. Such a small gap width of only a few millimeters is perfectly sufficient to illuminate the gap, for example by means of a lighting device arranged in the handle part, in such a way that light emerges via the annular gap, and to bring about the illuminated annular gap desired in accordance with the invention and to make it easier to locate the door handle.

In an advantageous refinement of the solution according to the invention, the gap, i.e., the annular gap present between the door handle and the handle cavity, has a gap width $S_3$ between 5 mm and 10 mm when the handle part is in its extended use position. When the handle part is in its use position and the lighting device is activated at the same time, it is thus possible to illuminate, for example, the handle part, the handle cavity, and/or the area surrounding the handle without any problems, whereby a lighting situation can be created for a user that allows optimum actuation or gripping of the handle part and thus opening of the vehicle door.

In a further advantageous embodiment of the solution according to the invention, at least one edge lighting element or at least one edge light guide element is provided on the handle part and, when the handle part is in its extended use position, allows the handle part to be illuminated at least partially at its edge. In this case, it can thus be provided that the lighting device, the lighting element, and/or the light guide element does not illuminate the handle part as such, but only an edge thereof, whereby either a type of background lighting is created, for example, which makes the handle part appear dark and thus easy to find, or which illuminates the handle part in a, preferably circumferential, edge region, whereby the handle part stands out brightly in relation to the handle cavity and is thus also easier to find.

A control device is expediently provided that is designed in such a way that it adjusts a light intensity of the at least one lighting element depending on the position of the handle part, in particular increasing it with increasing state of extension. In this way, it can be achieved that the gap or annular gap is only comparatively weakly illuminated when the handle part is only in its intermediate position, although the illumination is sufficient to easily visually recognize and thus locate the handle part even from a relatively great distance. When the handle part is extended further into its use position, the light intensity can be increased by means of the control device, for example, thereby improving the visual close-up situation for a user. Additionally, or alternatively, it is also conceivable that the control device is designed in such a way that it adjusts a color of the light emitted by the at least one lighting element depending on the position of the handle part. For example, it is conceivable that the lighting element emits red light when the handle part is in its intermediate position and thus illuminates the gap between the handle part and the handle cavity in red, which is particularly positive for the ability to find the handle part at a distance, since red light is also more visible in the dark from a distance. For this reason, brake lights or traffic lights, for example, are red if they are intended to signal a safety-relevant stop function. If the handle part is then extended into its use position, the color of the light emitted by the at least one lighting element can, for example, change to yellow or, depending on the design requirement, also to blue or green, whereby an individual and extremely interesting lighting situation can be created. By means of corresponding LEDs, this is possible without any problems and also at low cost.

It is expedient that the handle part of the door handle can be moved in translation or can be pivoted between its use position and its non-use position. Thus, retractable and extendable handle parts as well as handle parts that can be pivoted in and pivoted out can be used with the door handle according to the invention.

The present invention is further based on the general concept of providing a motor vehicle having a vehicle door, a door lock, an electronic key for locking and unlocking the door lock, and a door handle according to any of the discussion above. By means of such a motor vehicle, it is possible to transfer the advantages described with respect to the door handle to the motor vehicle, so that, for example, by means of the handle part extended into its partially extended intermediate position, a ring-like target illumination can be created that significantly facilitates the process of locating the motor vehicle and, in particular, also of visually targeting the door handle from a greater distance, for example several meters, and, in particular, significantly improves visual locating in comparison to diffusely illuminated door handles known so far from the prior art.

The present invention is further based on the general concept of providing a method for operating a previously described door handle on the previously described motor vehicle, in which method the handle part is initially in its retracted non-use position with the lighting device simultaneously deactivated. The handle part is now transferred from its retracted non-use position into a partially extended intermediate position, i.e., into an intermediate position in which the handle part is partially extended, wherein the at least one lighting element and/or the at least one light guide element at least partially illuminates a gap present between the handle part and the handle cavity as soon as an authorized user, in particular with the aforementioned electronic key, approaches the motor vehicle. Such an electronic key can, for example, be an active remote control or part of a remote polling system. The annular gap lighting can be used to create an optical target system, which makes it much easier to find the door handle or the handle part even from a greater distance, for example several meters, the annular gap lighting according to the invention having the effect of leading to the target. Purely theoretically, it could even be provided that the light emitted by the at least one lighting element or light guide element changes color, light intensity, or the like when the handle part is partially extended in its intermediate position, in order to further improve the optical locating effect. If the authorized user approaches closer, the handle part is transferred from the partially extended intermediate position into the fully extended use position, and the at least one lighting element and/or the at least one light guide element then illuminates at least parts of the handle part, of the handle cavity and/or of an area surrounding the handle and thereby facilitates the visual handling or gripping of the handle part and increases the ease of use. It is also of particular advantage for the ability to find the handle part that the lighting device produces a clearly contoured annular line-like illumination when the handle part is in its intermediate position, while it allows a diffuse illumination when the handle part is fully extended, which in particular causes the handle cavity to be illuminated and the light striking it to be reflected.

In a further advantageous embodiment of the solution according to the invention, a control device is provided that adjusts a light intensity of the at least one lighting element depending on the position of the handle part, in particular increasing or reducing with increasing state of extension. Additionally, or alternatively, the control device can also set or vary a color of the light emitted by the at least one lighting element depending on the position of the handle part. For example, it is conceivable that when the handle part is in its intermediate position, the lighting device emits red light, which can be perceived better, in particular from a greater distance, than white or yellow light, for example. If the user continues to approach and the handle part is fully extended into its use position, the color can be changed to yellow or white, for example, which allows for better diffuse lighting.

Theoretically, it is of course also conceivable that the lighting device emits light with a high luminous intensity when the handle is in its intermediate position, since in this case the light can only exit via the annular gap, so that this forms a kind of target ring around the handle part in the strongly illuminated state. If the handle part is extended further, the light intensity can be reduced, for example, because less bright diffuse lighting is sufficient when the user is standing directly at the door handle.

Further important features and advantages of the invention will become apparent from the dependent claims, from the drawings and from the associated description of figures provided on the basis of the drawings.

It is understood that the features mentioned above and those to be explained below can be used not only in the combination indicated in each case, but also in other combinations or on their own, without departing from the scope of the present invention.

Preferred exemplary embodiments of the invention are shown in the drawings and will be explained in more detail in the following description, wherein like reference signs refer to like or similar or functionally like components.

BRIEF DESCRIPTION OF THE DRAWING FIGURES

Figure 2:
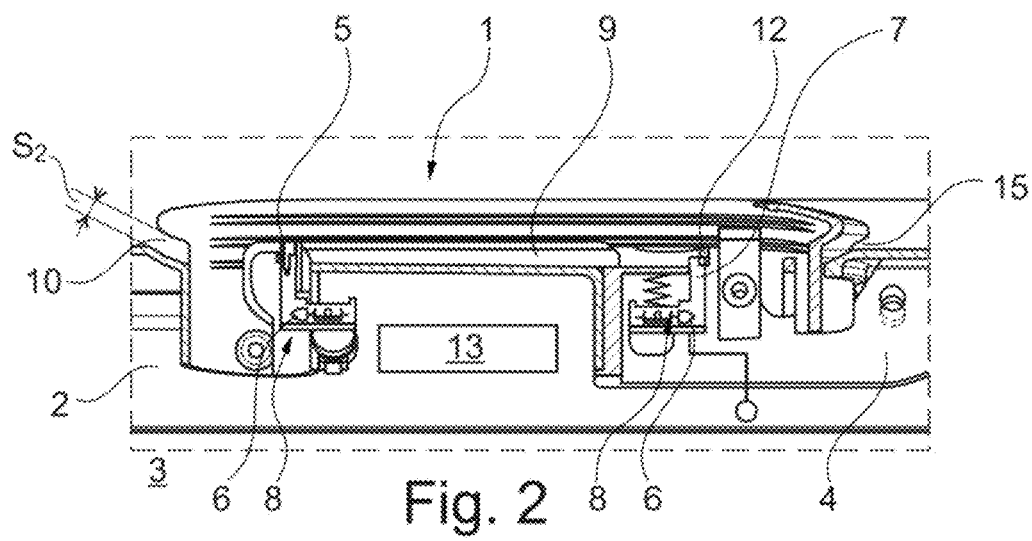
Figure 3:
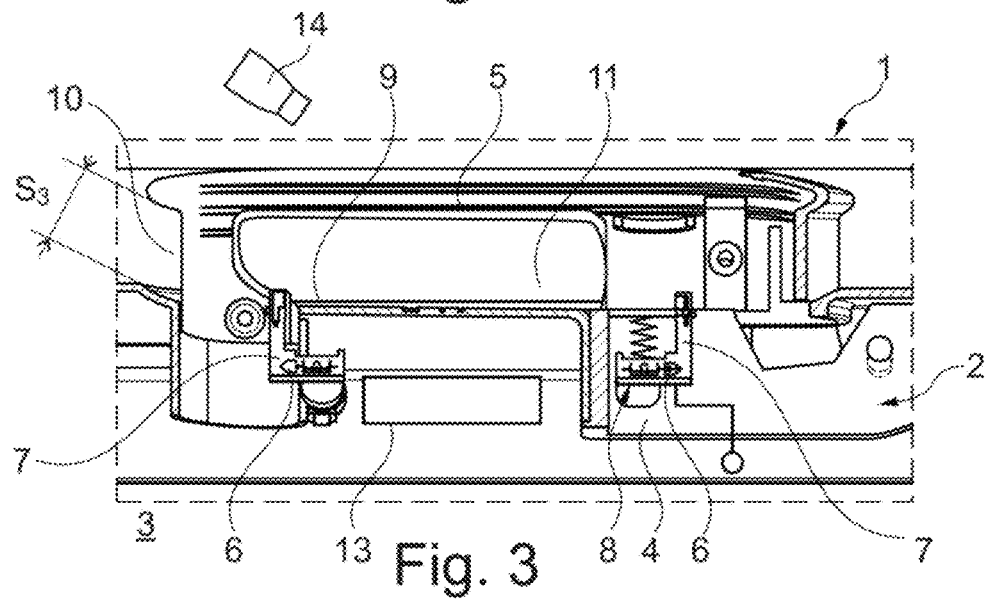
Figure 4:
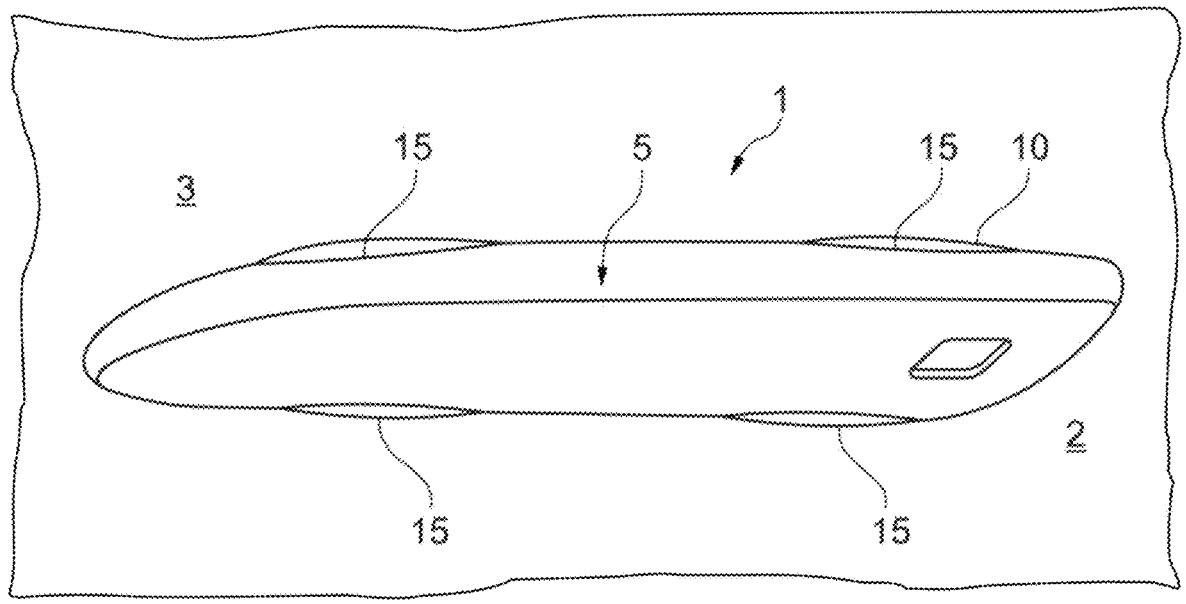
Figure 5:
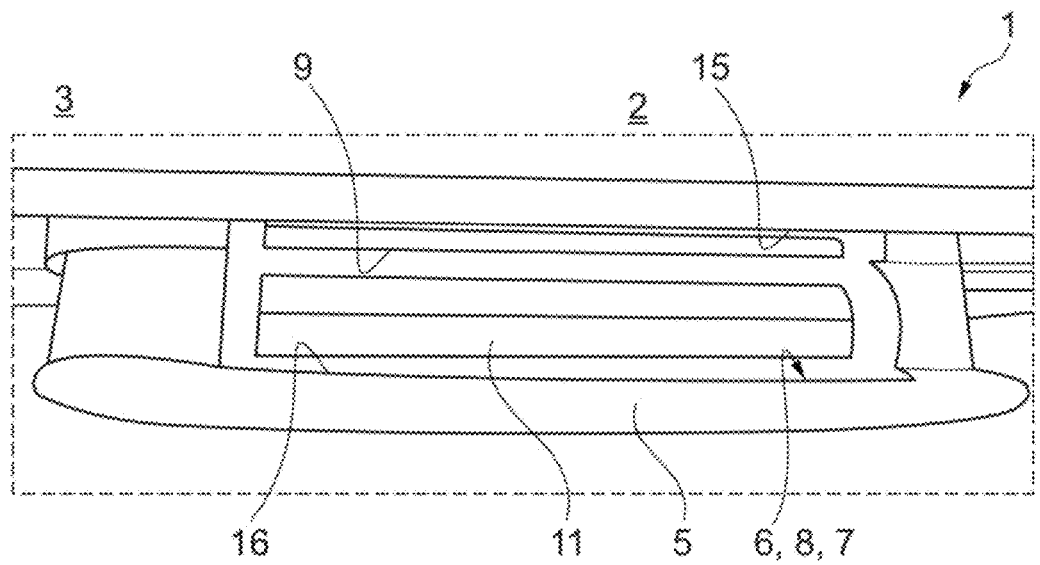

The figures show, schematically in each case:

FIG. 1 a sectional depiction through a door handle according to the invention in a vehicle door with the handle part in its non-use position and the lighting device deactivated, FIG. 2 a depiction as in FIG. 1, but with the handle part in its partially extended intermediate position and activated lighting device for illuminating a gap present between the handle cavity and the handle part, FIG. 3 a depiction as in FIG. 1, but with the handle part in its use position and activated lighting device, FIG. 4 a side view of a handle part of a door handle according to the invention in its intermediate position, FIG. 5 a view from above of a handle part in its use position with activated lighting device.

DETAILED DESCRIPTION

According to FIGS. 1 to 3, a door handle 1 according to the invention for a vehicle door 2 of a motor vehicle 3 has a carrier plate 4 and an extendable handle part 5. Also provided is a lighting device 8 with at least one lighting element 6 and/or a light guide element 7, wherein the lighting device 8 can be arranged in or on the carrier plate 4 or on the handle part 5. Theoretically, it is of course also conceivable to arrange a lighting element 6 or a light guide element 7 both on the handle part 5 and on the carrier plate 4. The handle part 5 can be adjusted here between a retracted non-use position (see FIG. 1), a partially extended intermediate position (see FIGS. 2 and 4) and an extended use position. In the retracted non-use position according to FIG. 1, a gap 10 between a handle cavity 9 and the handle part 5 is extremely small, i.e., it has, for example, a gap width $S_1$ of <1 mm. In the partially extended intermediate position of the handle part 5, as shown in accordance with FIG. 2, the gap 10 has increased to a gap width $S_2$ of between 1 mm and 5 mm, preferably between 3 mm and 5 mm. When the handle part 5 is in its use position, i.e., preferably fully extended, the gap width $S_3$ of the gap 10 has increased to 5 mm to 10 mm, as shown in accordance with FIG. 3.

In accordance with the invention, when the handle part 5 is in its partially extended intermediate position, the at least one lighting element 6 and/or the at least one light guide element 7 at least partially illuminates the gap 10 between the handle part 5 and the handle cavity 9 (see FIG. 4), whereby a kind of annular gap illumination surrounding the handle part 5 can be generated, which not only allows an intuitive and thus simple locating of the handle part 5 in the dark, but also an extremely interesting design, since it forms a clearly contoured light line at least partially surrounding the handle part 5, in comparison to diffuse illuminations known so far from the prior art.

When the handle part 5 is extended, as shown in accordance with FIG. 3, the lighting element 6 and/or the at least one light guide element 7 illuminate at least parts of the handle part 5, the handle cavity 9, and/or an area 11 surrounding the handle part.

At least one edge lighting element 6 or at least one edge light guide element 7 can be provided on the handle part 5 and, when the handle part 5 is in its extended use position, allows an illumination that at least partially surrounds the handle part 5 (see FIG. 5). In this case, the at least one lighting element 6 or the at least one edge light guide element 7 emits light in the direction of the handle cavity 9 and is reflected outwards from there, whereby the gap illumination according to the invention can be achieved.

A control device 12 is also expediently provided, which is designed in such a way that it sets a light intensity of the at least one lighting element 6 depending on the position of the handle part 5, in particular increasing or reducing it with increasing state of extension. The control device 12 can additionally or alternatively be designed in such a way that it adjusts a color of the light emitted by the at least one lighting element 6 as a function of the position of the handle part 5. The lighting element 6 can, for example, be designed as a light-emitting diode (LED) and thus not only be dimmable, but also generate light with different colors. For example, it is conceivable that when the handle part 5 is in its intermediate position, the lighting device 6 emits red light, which can be perceived better, especially from a greater distance. If the user continues to approach and the handle part 5 is extended into its use position, the color can be changed to yellow or white, for example, which allows for better diffuse lighting. Theoretically, it is of course also conceivable that the lighting device 8 emits light with a high luminous intensity when the handle part 5 is in its intermediate position, since in this case the light can only exit via the annular gap, so that this forms a kind of target ring around the handle part 5 in the strongly illuminated state. If the handle part 5 is extended further, the light intensity can be reduced, for example, because less bright, diffuse lighting is sufficient when the user is standing directly at the door handle 1.

In general, it is of course conceivable that the handle part 5 is translationally or pivotally adjustable between its retracted non-use position, its partially extended intermediate position and its extended use position. In FIGS. 1 to 5, however, only a translationally adjustable handle part 5 is shown. An adjustment device 13, in particular an electric motor, is provided for adjusting the handle part 5 between its non-use position and its use position.

In general, the door handle 1 on the motor vehicle 3 can be operated as follows:

Initially, a user approaches the motor vehicle 3, with the handle part 5 still being in its retracted non-use position and the lighting device 8 deactivated. If the user continues to approach the motor vehicle 3, the handle part 5 can be transferred from its retracted non-use position into a partially extended intermediate position, for example via remote polling or active operation of an electronic key 14 (see FIG. 2), and in this position the at least one lighting element 6 and/or the at least one light guide element 7 at least partially illuminates the gap 10 present between the handle part 5 and the handle cavity 9, thereby providing significant, clearly contoured locating lighting for the user.

If the driver continues to approach the motor vehicle 3 or actuates the electronic key 14, the handle part 5 is transferred from the partially extended intermediate position in accordance with FIG. 2 to the extended use position according to FIG. 3 and the at least one lighting element 6 and/or the at least one light guide element 7 illuminate at least parts of the handle part 5 (see FIG. 5), the handle cavity 9 and/or an area 11 surrounding the handle part. The complete extension of the handle part 5 into its use position can also be coupled with the opening of a door lock of the motor vehicle 3.

The control device 12 can, at the same time, adjust a light intensity of the at least one lighting element 6 depending on the position of the handle part 5, in particular increase or decrease it with increasing state of extension of the handle part 5 and/or vary a color of the light emitted by the lighting element 6.

Looking again at FIGS. 4 and 5, it can be seen from these that, for example according to FIG. 4, the lighting device 8 forms a light rim 15 at least partially surrounding the handle part 5, which according to FIG. 4 is in its intermediate position, forming a target illumination. This target illumination naturally remains present even when the handle part 5 is fully extended, since, for example, the at least one lighting element 6 continues to illuminate the handle cavity 9, as shown in accordance with FIG. 5. In addition, when the handle part 5 is fully extended, the at least one lighting element 6 can also illuminate the area 11 surrounding the handle, at least parts of the handle part 5, in particular an inner edge 16 thereof and/or the handle cavity 9.

All in all, the door handle 1 according to the invention can be used to create a significantly improved and, in terms of a design, extremely high-quality lighting ambience.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A door handle for a vehicle door of a motor vehicle, the door handle comprising:
   a carrier plate;
   a handle cavity;
   an extendable handle part; and
   at least one lighting device arranged in or on the carrier plate or on the handle part, wherein the at least one lighting device includes at least one lighting element or at least one light guide element,
   wherein the handle part is adjustable between a retracted non-use position, a partially extended intermediate position, and an extended use position,
   wherein the at least one lighting element or the at least one light guide element, when the handle part is in the partially extended intermediate position, at least partially illuminates a gap between the extendible handle part and the handle cavity, and
   wherein, when the extendible handle part is in the extended use position, illuminates at least parts of the extendible handle part, the handle cavity, or an area surrounding the extendible handle part.

2. The door handle of claim 1, wherein the gap has a gap width between 3 mm and 5 mm when the extendible handle part is in the partially extended intermediate position.

3. The door handle of claim 2, wherein the gap has a gap width between 5 mm and 10 mm when the extended handle part is in the extended use position.

4. The door handle of claim 1, wherein the extendible handle part includes at least one edge lighting element or at least one edge light guide element, and when the extendible handle part is in the extended use position, the at least one edge lighting element or the at least one edge light guide element produces an illumination that at least partially surrounds the extendible handle part as a light edge.

5. The door handle of claim 1, further comprising:
   a control device, wherein the control is configured to
   set a light intensity of the at least one lighting element depending on a position of the extendible handle part so that the light intensity is increased or reduced based on the position of the extendible handle part, or
   adjust a color of light emitted by the at least one lighting element based on the position of the extendible handle part.

6. The door handle of claim 1, wherein the extendible the handle part is translationally or pivotally adjustable between the extended use position and the retracted non-use position.

7. A motor vehicle, comprising:
   a vehicle door;
   a door lock;
   an electronic key configured to lock and unlock the door lock; and
   a door handle, which comprises
   a carrier plate;
   a handle cavity;
   an extendable handle part; and
   at least one lighting device arranged in or on the carrier plate or on the handle part, wherein the at least one lighting device includes at least one lighting element or at least one light guide element,
   wherein the handle part is adjustable between a retracted non-use position, a partially extended intermediate position, and an extended use position,
   wherein the at least one lighting element or the at least one light guide element, when the handle part is in the partially extended intermediate position, at least partially illuminates a gap between the extendible handle part and the handle cavity, and
   wherein, when the extendible handle part is in the extended use position, illuminates at least parts of the extendible handle part, the handle cavity, or an area surrounding the extendible handle part.

8. A method for operating a door handle on a motor vehicle, the method comprising:
   detecting that an authorized user with an electronic key approaches the motor vehicle;
   extending, responsive to the detection, a handle part of the door handle from a retracted non-use position into a partially extended intermediate position,
   at least partially illuminating, responsive to the detection, a gap between the handle part and a handle cavity of the door handle by at least one lighting element or at least one light guide element that is part of the door handle;

determining that the authorized user opens a door lock of the motor vehicle with the electronic key;

transferring, responsive to the determination, the handle part from the partially extended intermediate position into an extended use position;

illuminating, responsive to the determination and using the at least one lighting element or the at least one light guide element, at least parts of the handle part, the handle cavity or of an area surrounding the handle part.

9. The method of claim 8, wherein a light intensity of the at least one lighting element is set depending on a position of the handle part so that the light intensity increases or reduces with increasing state of extension of the handle part.

10. The method of claim 8, wherein a color of light emitting by the at least one lighting element is adjusted as a function of a position of the handle part.

\* \* \* \* \*